US008706032B2

(12) United States Patent
Zhang et al.

(10) Patent No.: US 8,706,032 B2
(45) Date of Patent: Apr. 22, 2014

(54) SYSTEMS AND METHODS FOR PROVIDING COLLABORATIVE COEXISTENCE BETWEEN BLUETOOTH AND WI-FI

(75) Inventors: Zhenyu Zhang, Campbell, CA (US);
James Jan, San Jose, CA (US);
Shuangqing Yuan, Fremont, CA (US);
Cuifeng Zhou, Santa Clara, CA (US);
George Lee, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 902 days.

(21) Appl. No.: 12/100,318

(22) Filed: Apr. 9, 2008

(65) Prior Publication Data

US 2008/0254745 A1   Oct. 16, 2008

Related U.S. Application Data

(60) Provisional application No. 60/910,921, filed on Apr. 10, 2007, provisional application No. 60/914,900, filed on Apr. 30, 2007.

(51) Int. Cl.
*H04B 7/00*   (2006.01)

(52) U.S. Cl.
USPC ................................... 455/41.2; 455/552.1

(58) Field of Classification Search
USPC ........ 455/41.2, 501, 41.1, 41.3, 552.1, 553.1, 455/562.1, 575.7, 101; 370/338, 913, 908, 370/277
See application file for complete search history.

(56) References Cited

U.S. PATENT DOCUMENTS

| | | | |
|---|---|---|---|
| 7,486,932 B2 * | 2/2009 | Palin et al. | 370/338 |
| 7,634,231 B2 * | 12/2009 | Hundal | 455/63.1 |
| 2004/0192222 A1 * | 9/2004 | Vaisanen et al. | 455/78 |
| 2005/0170776 A1 * | 8/2005 | Siorpaes | 455/41.2 |
| 2006/0084383 A1 | 4/2006 | Ibrahim et al. | |
| 2006/0194538 A1 * | 8/2006 | Palin et al. | 455/41.2 |
| 2006/0211372 A1 | 9/2006 | Shellhammer et al. | |
| 2006/0274704 A1 * | 12/2006 | Desai et al. | 370/338 |
| 2007/0224935 A1 * | 9/2007 | Waxman | 455/41.2 |
| 2010/0284380 A1 * | 11/2010 | Banerjee et al. | 370/338 |

OTHER PUBLICATIONS

PCT International Search Report and Written Opinion of the International Searching Authority, issued Jun. 30, 2008, application No. PCT/US08/59802.

* cited by examiner

*Primary Examiner* — Nay A Maung
*Assistant Examiner* — Angelica M Perez

(57) ABSTRACT

Methods and systems are described for providing Bluetooth and Wi-Fi coexistence on an electronic device. Aspects of exemplary embodiments include determining Bluetooth link parameters for a Bluetooth connection and Wi-Fi link parameters for a Wi-Fi connection. Also, a Bluetooth path loss for the Bluetooth connection and a Wi-Fi path loss for the Wi-Fi connection can be determined. According to this embodiment, one or more link conditions, based upon one or more of the Bluetooth link parameters, the Wi-Fi link parameters, the Bluetooth path loss, and the Wi-Fi path loss, may be calculated to determine if simultaneous collaboration between the Bluetooth connection and Wi-Fi connection is feasible. In response to simultaneous collaboration being feasible, the Bluetooth link parameters and the Wi-Fi link parameters are customized based on the one or more link conditions to permit simultaneous collaboration between the Bluetooth connection and the Wi-Fi connection.

20 Claims, 4 Drawing Sheets

SYSTEMS AND METHODS FOR PROVIDING COLLABORATIVE COEXISTENCE BETWEEN BLUETOOTH AND WI-FI

CROSS-REFERENCE TO RELATED APPLICATIONS

This application claims the benefit of U.S. Provisional Patent Application No. 60/910,921, filed Apr. 10, 2007, and U.S. Provisional Patent Application No. 60/914,900, filed Apr. 30, 2007, assigned to the assignee of the present application, and incorporated herein by reference.

BACKGROUND OF THE INVENTION

Bluetooth™ and Wi-Fi™ are two commonly used wireless data transmission protocols. Wi-Fi and Bluetooth both occupy a section of the 2.4 GHz Industrial, Scientific, and Medical ("ISM") band that is 83 MHz-wide. Bluetooth is an industrial specification that can be used for wireless personal area networks ("PANs"). Bluetooth can be used to connect and exchange information between devices such as mobile phones, laptops, personal computers, hand-held computers, printers, digital cameras, and video game consoles. Bluetooth can be particularly useful when transferring information between two or more devices that are near each other in low-bandwidth situations. Common applications of Bluetooth can include wireless control of and communication between a mobile phone and a hands-free headset (e.g., a Bluetooth earbud), wireless networking between computers for certain applications, and wireless communications between a computer and input and output devices (e.g., mice, keyboards, and printers). Bluetooth uses Frequency Hopping Spread Spectrum ("FHSS") and is allowed to hop between 79 different 1 MHz-wide channels in the ISM band.

Wi-Fi, an abbreviation of "wireless fidelity," refers to wireless technology based upon the IEEE 802.11 standards generally used for local area networking. Common applications for Wi-Fi include internet access and network connectivity for consumer electronics such as televisions, DVD players, and digital cameras. Wi-Fi generally uses the same radio frequencies as Bluetooth, but operates using higher power, generally resulting in a stronger connection that can cover a greater distance. Wi-Fi uses Direct Sequence Spread Spectrum (DSSS) instead of FHSS. Its carrier does not hop or change frequency, and is instead maintained on one channel that is 22 MHz-wide. There is room for 11 overlapping Wi-Fi channels in the ISM band, but there is only room for three non-overlapping channels. This means that no more than three different Wi-Fi networks may operate in close proximity to one another.

Because both Wi-Fi and Bluetooth wireless technology share spectrum and can often be located in close physical proximity to one another, there is a likelihood that some interference will occur. Neither Wi-Fi nor Bluetooth was originally designed with mechanisms in place to deal with the interference that each creates for the other. While Wi-Fi and Bluetooth technology can continue to function during interference, increasing levels of interference can result in a slowing of the data rate as more packets need to be resent. In some conditions of extreme interference, communications can cease altogether.

Interference can particularly be a concern in electronic devices that contain both Wi-Fi and Bluetooth technology, such as smart wireless telephones and other similar devices. While such devices may operate if the problem is ignored, data rate degradation may occur as described above. This degradation can affect the user, for example, in the form of degradation of audio quality heard in a Bluetooth earbud. Another potential problem occurs when the Bluetooth receiver contained within the device is saturated by Wi-Fi transmissions, or vice versa.

BRIEF SUMMARY OF THE INVENTION

Methods and systems are described for providing a multi-layer approach for Bluetooth and Wi-Fi collaborative coexistence on an electronic device. Aspects of the exemplary embodiments include determining Bluetooth link parameters for a Bluetooth connection and Wi-Fi link parameters for a Wi-Fi connection. Also, a Bluetooth path loss for the Bluetooth connection and a Wi-Fi path loss for the Wi-Fi connection can be determined. According to this embodiment, one or more link conditions, based upon one or more of the Bluetooth link parameters, the Wi-Fi link parameters, the Bluetooth path loss, and the Wi-Fi path loss, may be calculated to determine if simultaneous collaboration between the Bluetooth connection and Wi-Fi connection is feasible. In response to simultaneous collaboration being feasible, the Bluetooth link parameters and the Wi-Fi link parameters are altered based on the one or more link conditions to permit simultaneous collaboration between the Bluetooth connection and the Wi-Fi connection.

In another embodiment, exclusive collaboration can be implemented to allow coexistence between the Bluetooth connection and the Wi-Fi connection when simultaneous collaboration is unfeasible. For example, it can be determined if a Wi-Fi connection that exists between the electronic device and a Wi-Fi access point is active if a Bluetooth connection is active. When the Bluetooth connection is active while the Wi-Fi connection is active, a signal, such as a clear-to-send-to-self transmission, is transmitted to the Wi-Fi access point that precludes the Wi-Fi access point from transmitting frames in the area proximate to the electronic device.

DETAILED DESCRIPTION OF THE INVENTION

The present invention relates to a multi-layer approach for co-existence between Wi-Fi and Bluetooth. The following description is presented to enable one of ordinary skill in the art to make and use the invention and is provided in the context of a patent application and its requirements. Various modifications to the embodiments and the generic principles and features described herein can be made. Thus, the present invention is not intended to be limited to the embodiments shown, but is to be accorded the widest scope consistent with the principles and features described herein.

Figure 1:
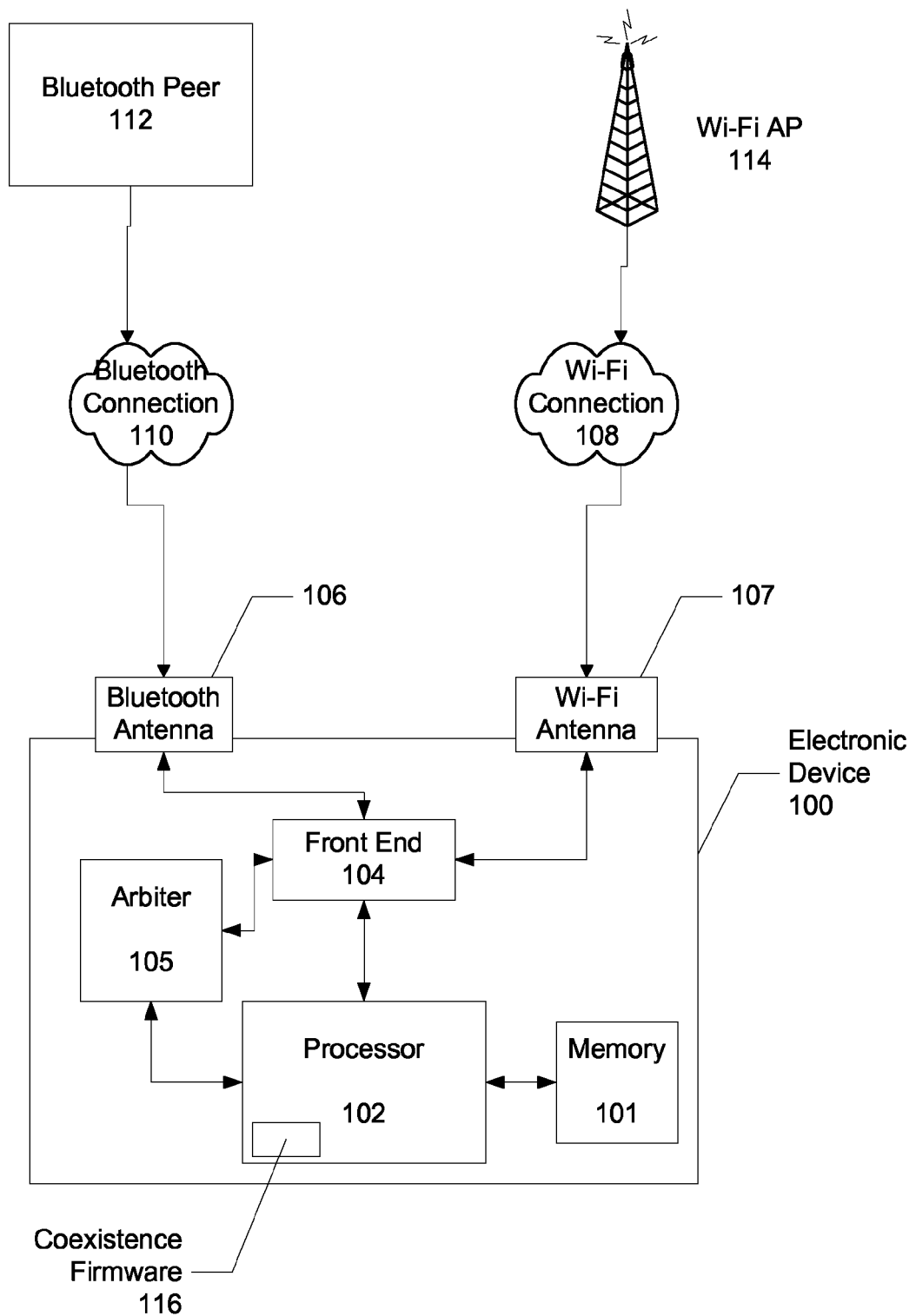
FIG. 1 illustrates an exemplary embodiment of a system for providing collaborative coexistence between Bluetooth and Wi-Fi on an electronic device.

FIG. 1 illustrates an exemplary embodiment of a system for providing collaborative coexistence between Bluetooth and Wi-Fi on an electronic device. The system includes an electronic device 100, a Bluetooth peer 112 and a Wi-Fi AP 114. Electronic device 100, as described herein, may be any electronic device operative to utilize both Bluetooth and Wi-Fi transmissions. The electronic device 100 may be generally any portable, mobile, or hand-held wireless electronic device having Bluetooth and Wi-Fi functionality collocated on the same device. Furthermore, the electronic device 100 may have separate antennas for Bluetooth and Wi-Fi signals in one embodiment. In another embodiment, however, a single antenna can be used.

According to the exemplary embodiment, the electronic device 100 includes coexistence firmware 116, which can adjust link parameters and change the behavior of the electronic device 100 to provide a collaborative solution to interference between Bluetooth and Wi-Fi. Collaboration can be simultaneous or exclusive. Simultaneous collaboration refers to the state wherein Bluetooth and Wi-Fi signals are transmitted and received at substantially the same time, and can be desirable because simultaneous collaboration can provide the fastest response time to user queries and can provide more flexibility (e.g., reduced power consumption, fewer complications) than exclusive collaboration. Exclusive collaboration refers to the state wherein substantially only one of the Bluetooth connection and the Wi-Fi connection are transmitting/receiving at any given time.

The electronic device 100 can include a memory 101, a processor 102 (which executes coexistence firmware 116 and which functions as described below), a front end 104, and an arbiter 105. The coexistence firmware 116 can use the front end 104 to implement collaborative coexistence, described in greater detail below.

The electronic device 100 can also include Bluetooth antenna 106 and Wi-Fi antenna 107. The electronic device 100 can utilize the Bluetooth antenna 106 to maintain Bluetooth connection 110 with Bluetooth peer 112, wherein the Bluetooth connection 110 includes Bluetooth link parameters. Similarly, the electronic device 100 can utilize the Wi-Fi antenna 107 to maintain Wi-Fi connection 108 with Wi-Fi AP 114, wherein the Wi-Fi connection 108 includes Wi-Fi link parameters. In some embodiments, a single antenna can be used to provide the functionality of the Bluetooth antenna 106 and the Wi-Fi antenna 107. The front end 104 is coupled to the Wi-Fi antenna 107 and the Bluetooth antenna 106, and is configured to permit substantially simultaneous transmitting and receiving of Bluetooth and Wi-Fi.

Based upon link conditions, the electronic device 100 can utilize simultaneous collaboration or exclusive collaboration to permit Bluetooth connection 110 and Wi-Fi connection 108 to coexist as described below. In one embodiment, the coexistence firmware 116 is configured to determine a Bluetooth path loss for the Bluetooth connection and a Wi-Fi path loss for the Wi-Fi connection, and to calculate one or more link conditions, based upon one or more of the Bluetooth link parameters, the Wi-Fi link parameters, the Bluetooth path loss, and the Wi-Fi path loss, to determine if simultaneous collaboration between the Bluetooth connection and Wi-Fi connection is feasible. Feasible in this context means that the Bluetooth-Wi-Fi interference does not exceed a predetermined threshold level of performance for the Bluetooth connection and/or the Wi-Fi connection, which can be prestored within the electronic device.

Figure 2:
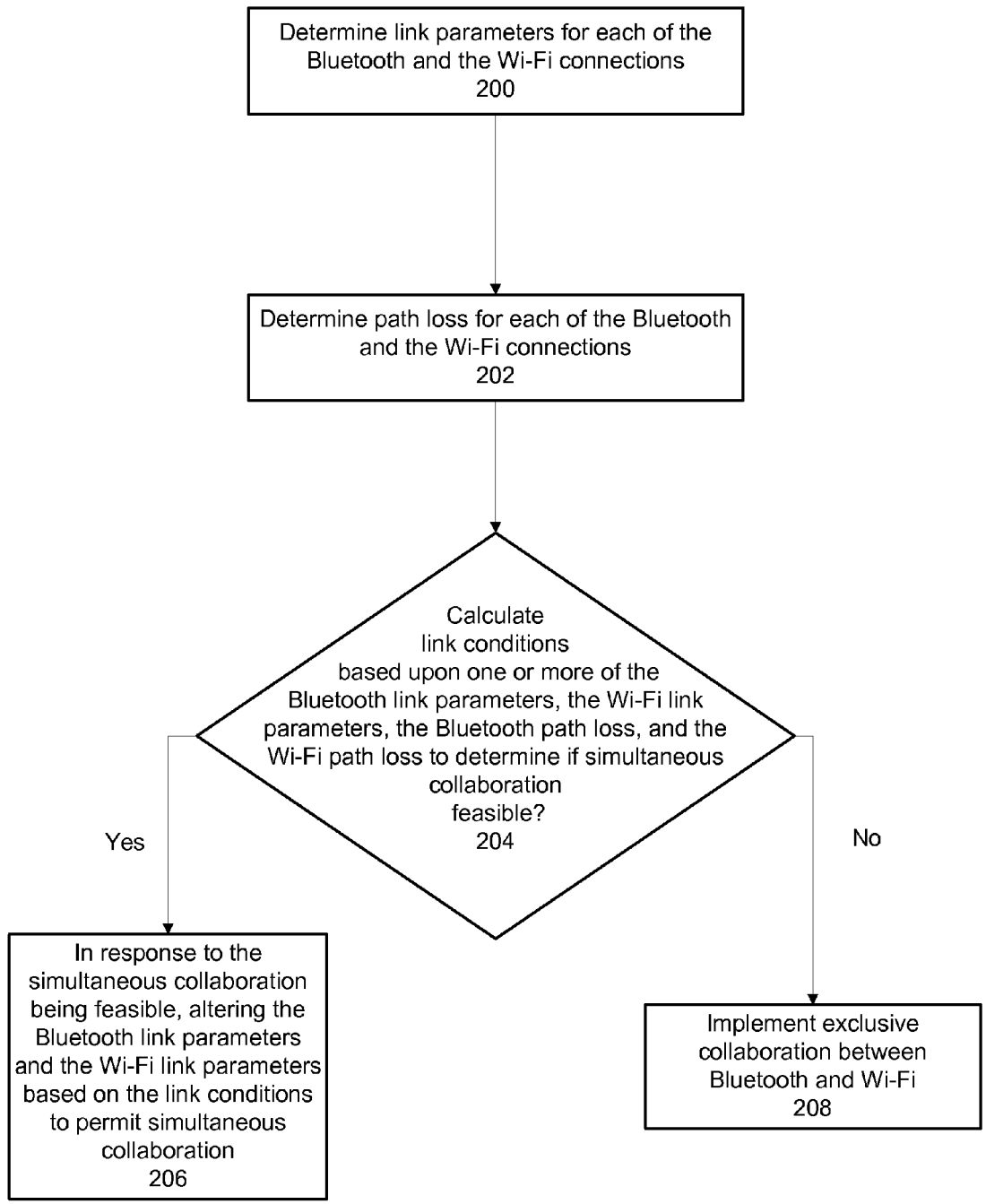
FIG. 2 illustrates an exemplary embodiment of a multi-layer collaborative coexistence process for Bluetooth and Wi-Fi.

FIG. 2 illustrates an exemplary embodiment of a multi-layer collaborative coexistence process for Bluetooth and Wi-Fi. The process determines whether to implement simultaneous or exclusive collaborative coexistence between Bluetooth and Wi-Fi on the electronic device 100. The process may begin by determining link parameters for each of the Bluetooth and the Wi-Fi connections 110 and 108, respectively, on the electronic device 100 (block 200). The Bluetooth connection 110 includes Bluetooth link parameters and the Wi-Fi connection 108 includes Wi-Fi link parameters.

The Bluetooth link parameters include information about incoming and outgoing Bluetooth signals. The information can include outgoing Bluetooth transmit power and frequency, and the power and frequency of received Bluetooth signals. The Bluetooth link parameters can be requested from the Bluetooth peer 112 or can be measured by the electronic device 100 (e.g., by using a feedback loop). Likewise, Wi-Fi link parameters include information about incoming and outgoing Wi-Fi signals. The information can include outgoing Wi-Fi transmit power and frequency, and the power and frequency of received Wi-Fi signals. The Wi-Fi link parameters can be requested from the Wi-Fi access point 114 or can be measured by the electronic device 100 (e.g., by using a feedback loop).

Once the Bluetooth and Wi-Fi link parameters have been received, the electronic device 100 may determine path loss for incoming and outgoing signals for each of the Bluetooth and the Wi-Fi connections 110 and 108, respectively (block 202).

The electronic device 100 may also calculate one or more link conditions, based upon one or more of the Bluetooth link parameters, the Wi-Fi link parameters, the Bluetooth path loss, and the Wi-Fi path loss, to determine if simultaneous, rather than exclusive, collaboration between the Bluetooth connection 110 and the Wi-Fi connection 108 can be implemented (block 204). In one embodiment, the coexistence firmware 116 is configured to determine that simultaneous collaboration is feasible when Bluetooth-Wi-Fi interference does not exceed a predetermined threshold level of performance for the Bluetooth connection and/or the Wi-Fi connection.

Whether simultaneous or exclusive collaboration can be pursued is generally dependent upon the hardware used in the electronic device 100 and link conditions. Any interference parameter (a parameter that corresponds to an effect caused by interference), alone or in combination with other interference parameters, can be used to determine whether or not simultaneous or exclusive collaboration is used, with preference generally given to simultaneous collaboration.

In one embodiment, the predetermined threshold of performance for the Bluetooth connection and/or the Wi-Fi connection is based on at least the Bluetooth link parameters, the Wi-Fi link parameters, the Bluetooth path loss, and the Wi-Fi path loss. For example, two interference parameters that can be used are receiver saturation of the Bluetooth and Wi-Fi receivers and the signal-to-noise ratios of the Bluetooth and Wi-Fi transmissions transmitted and received by the electronic device 100. The receiver saturation of the Bluetooth and Wi-Fi receivers can be predicted based upon, for example, the spectral masks of the Bluetooth and Wi-Fi connections 110 and 108. These spectral masks can define the operating frequencies of the Bluetooth and Wi-Fi connections 110 and 108, respectively. The Bluetooth receiver of the electronic device 100 can be saturated by Wi-Fi signals transmitted either by the Wi-Fi access point 114 or the Wi-Fi transmitter of the electronic device 100, or vice versa, if the operating frequencies of the signals are too close, for example. The possibility of receiver saturation can dictate that exclusive collaboration is used instead of simultaneous collaboration by the electronic device 100. Similarly, if the signal-to-noise ratio exceeds a threshold (generally set by the hardware limitations of the Bluetooth and Wi-Fi receivers)

during substantially simultaneous transmission/receipt, the electronic device 100 can opt for exclusive collaboration instead of simultaneous collaboration.

Various algorithms, which can be referred to as link conditions, may be used to determine if the receiver saturation and signal to noise ratios permit simultaneous collaboration. The following equations are an exemplary embodiment of these algorithms. As used below, $C/I_{threshold}$ refers to signal strength to interference ratio, and RSSI refers to received signal strength indication. In one implementation, the equations are used to calculate eight link conditions (Cond1-Cond8) by performing Bluetooth link analysis at both the Bluetooth peer 112 and the electronic device 100, and by performing WiFi link analysis at both the Wi-Fi AP 114 and the electronic device 100.

Bluetooth link analysis at electronic device:

$$RSSI_{from\_BT\_peer} - (RSSI_{from\_AP} - \text{SpectrumMask}_{wi-fi}) >= C/I_{threshold} \quad \text{Cond1}$$

$$RSSI_{from\_device\_BT} - (RSSI_{from\_device\_wi-fi} - \text{SpectrumMask}_{wi-fi}) >= C/I_{threshold} \quad \text{Cond2}$$

Wherein:
$RSSI_{from\_BT\_peer} = TxPwr_{peer\_BT} - \text{Pathloss}_{Peer-to-Device}$
$RSSI_{from\_AP} = TxPwr_{AP} - \text{Pathloss}_{AP-to-Device}$
$RSSI_{from\_device\_STA} = TxPwr_{device\_STA} - \text{Couplerloss}$
$\text{SpectrumMask}_{wifi} = f(Freq_{WiFi}, Mode_{WiFi}, Freq_{BT})$ Bluetooth link analysis at Bluetooth peer:

$$RSSI_{from\_device\_BT} - (RSSI_{from\_AP} - \text{SpectrumMask}_{wi-fi}) >= C/I_{threshold} \quad \text{Cond3}$$

$$RSSI_{from\_device\_BT} - (RSSI_{from\_device\_wi-fi} - \text{SpectrumMask}_{wi-fi}) >= C/I_{threshold} \quad \text{Cond4}$$

Wherein:
$RSSI_{from\_device\_BT} = TxPwr_{device\_BT} - \text{Pathloss}_{Peer-to-Device}$
$RSSI_{from\_AP} = TxPwr_{Ap} - \text{Pathloss}_{AP-to-Device}$
$RSSI_{from\_device\_wi-fi} = TxPwr_{device\_wi-fi} - \text{Pathloss}_{Peer-to-Device}$
$\text{SpectrumMask}_{wi-fi} = f(Freq_{Wi-fi}, Mode_{Wi-fi}, Freq_{BT})$ Wi-Fi link analysis at electronic device:

$$RSSI_{from\_AP} - NF_{device\_WI-FI} - (RSSI_{from\_BT\_peer} - \text{SpectrumMask}_{BT}) >= SNR_{threshold}(\text{rate}) \quad \text{Cond5}$$

$$RSSI_{from\_AP} - NF_{device\_WI-FI} - (RSSI_{from\_device\_BT} - \text{SpectrumMask}_{BT}) >= SNR_{threshold}(\text{rate}) \quad \text{Cond6}$$

Wherein:
$RSSI_{from\_AP} = TxPwr_{AP} - \text{Pathloss}_{AP-to-Device}$
$RSSI_{from\_BT\_peer} = TxPwr_{peer\_BT} - \text{Pathloss}_{Peer-to-Device}$
$RSSI_{from\_device\_BT} = TxPWr_{device\_BT} - \text{Couplerloss}$
$\text{SpectrumMask}_{BT} = f(Freq_{Wi-fi}, Freq_{BT})$ Wi-Fi link analysis at AP:

$$RSSI_{from\_device\_WI-FI} - NF_{AP} - (RSSI_{from\_BT\_peer} - \text{SpectrumMask}_{BT}) >= SNR_{threshold}(\text{rate}) \quad \text{Cond7}$$

$$RSSI_{from\_device\_WI-FI} - NF_{AP} - (RSSI_{from\_device\_BT} - \text{SpectrumMask}_{BT}) >= SNR_{threshold}(\text{rate}) \quad \text{Cond8}$$

Wherein:
$RSSI_{from\_AP} = TxPWr_{Ap} - \text{Pathloss}_{Device-to-AP}$
$RSSI_{from\_peer\_BT} = TxPwr_{peer\_BT} - \text{Pathloss}_{Peer-to-AP}$
$RSSI_{from\_device\_BT} = TxPWr_{device\_BT} - \text{Pathloss}_{Device-to-AP}$
$\text{SpectrumMask}_{BT} = f(Freq_{Wi-fi}, Freq_{BT})$ In response the simultaneous collaboration being feasible, the Bluetooth link parameters and the Wi-Fi link parameters are altered based on the one or more link conditions to permit simultaneous collaboration between the Bluetooth connection and the Wi-Fi connection (block 206).

In the example described by the algorithms, satisfaction of the various link conditions determines what adjustments need to be made by the coexistence firmware 116 to implement simultaneous collaboration. These adjustments can be pre-stored on the electronic device (e.g., as hardwired logic or as software stored in memory). The coexistence firmware 116 may customize the Bluetooth link parameters and the Wi-Fi link parameters based upon link conditions to allow simultaneous collaboration, as shown in the following example.

Table 1 shows an exemplary embodiment of a decision chart, wherein adjustments to Bluetooth and/or Wi-Fi link parameters are made based upon satisfaction or non-satisfaction of the aforementioned eight link conditions, as shown:

TABLE 1

| \multicolumn{8}{c}{Condition} | |
|---|---|---|---|---|---|---|---|---|
| 1 | 2 | 3 | 4 | 5 | 6 | 7 | 8 | Adjustment/Action |
| Y | Y | Y | Y | Y | Y | Y | Y | BT and WiFi run simultaneously i.e., BT and WiFi are at different freq |
| N | N | N | N | | | | | WiFi signal from either AP or device interferes with BT session. i.e., BT and WiFi are freq overlapped and WiFi signal is too strong |
| X | Y | X | N | | | | | Invalid case: Device Wi-Fi signal does not cause interference to co-located BT |
| N | Y | Y | Y | | | | | AP interferes BT-peer reception |
| Y | N | Y | Y | | | | | WiFi signal from device interferes with co-located BT reception only |
| Y | Y | N | Y | | | | | AP interferes with device BT reception |
| N | N | Y | Y | | | | | Device BT is exposed to WiFi interference from AP and device |
| Y | N | Y | N | | | | | WiFi signal from device interferes with BT reception of earbud and phone i.e., AP is far, device needs high power to reach AP. |
| N | Y | N | Y | | | | | WiFi signal from AP damage BT reception of device and BT peer i.e., BT pair is very close to AP |
| Y | N | N | N | | | | | BT peer is between AP and device, AP is at medium range from device This state could transit to Y-Y-N-Y after device Wi-Fi txpower is reduced |

TABLE 1-continued

| | | | Condition | | | | | |
|---|---|---|---|---|---|---|---|---|
| 1 | 2 | 3 | 4 | 5 | 6 | 7 | 8 | Adjustment/Action |
| N | N | N | Y | | | | | AP is very close to device and BT peer, this state could transit to N-Y-N-Y after device Wi-Fi TxPower |
| N | N | Y | N | | | | | Device is between AP and BT peer, and AP is at medium range away from device. This state could transit to N-Y-Y-Y after device Wi-Fi txpower is reduced. |
| Y | Y | Y | Y | Y | Y | Y | Y | BT and Wi-Fi run simultaneously i.e., BT and Wi-Fi are at different freq |
| | | | | N | N | N | N | When BT is transmitting, Wi-Fi reception cannot succeed |
| | | | | X | Y | X | N | Invalid case: if device-BT couldn't disturb co-located Wi-Fi reception, it will not disturb AP reception. |
| | | | | N | Y | Y | Y | Device is too close to BT peer, while AP is relatively far, so BT peer could disturb Device WI-FI reception In order to transit to state Y-Y-Y-Y, BT peer txpwr can be reduced. |
| | | | | Y | N | Y | Y | Device-BT transmission could disturb device-WI-FI reception, Reduce device-BT txpwr may transit state to Y-Y-Y-Y |
| | | | | Y | Y | N | Y | BT peer is too close to AP, so it disturbs AP reception, In order to transit to state Y-Y-Y-Y, user can be instructed to move away from AP, or BT peer can be instructed to reduce txpower. |
| | | | | N | N | Y | Y | BT transmission disturbs device-WI-FI reception, Reducing device-BT txpower may transit Wi-Fite to X-Y-Y-Y. Reducing BT-BT peer txpower may transit state to Y-X-Y-Y. |
| | | | | Y | N | Y | N | BT peer doesn't disturb AP & Device-WI-FI reception, but device-BT can disturb Wi-Fi session, Reducing device-BT txpower may transit state to Y-Y-Y-Y or Y-N-Y-Y. |
| | | | | N | Y | N | Y | BT-BT peer disturbs device-WI-FI reception and AP-reception BT-BT peer txpower can be reduced to transit to Y-Y-Y-Y. |
| | | | | Y | N | N | N | AP reception disturbed by BT peer and device-BT, reducing Txpower of BT peer and device-BT, can transit to Y-Y-Y-Y state. |
| | | | | N | N | N | Y | Device-WI-FI reception is disturbed by BT-BT peer and co-located device-BT |
| | | | | N | N | Y | N | Reducing Device-BT txpower may transit state to X-Y-Y-Y or X-N-Y-Y. Reducing BT peer txpower may transit state to Y-X-Y-X. |

While the above describes an exemplary decision chart for adjusting link parameters for Bluetooth and Wi-Fi signals, respectively, based upon link conditions, in a further embodiment, the frequencies of the Bluetooth and Wi-Fi signals can be also adjusted to permit simultaneous collaboration. Among others, examples of these frequency adjustments can include: adjusting the adaptive frequency hopping setting of the Bluetooth connection, adjusting a Bluetooth golden range of the electronic device's Bluetooth receiver to influence the Bluetooth peer's transmission power, utilizing Bluetooth channel hopping, and causing the Wi-Fi AP to change the channel of the Wi-Fi connection.

As stated above, there can be times where the link conditions do not permit for simultaneous collaboration between Bluetooth and Wi-Fi, and in such cases exclusive collaboration between Bluetooth and Wi-Fi can be implemented (block 208). Exclusive collaboration, though generally not as preferable as simultaneous collaboration, can be superior to deactivation of either Bluetooth or Wi-Fi because it can permit a user to use both Bluetooth and Wi-Fi on the electronic device 100. For these scenarios, based on Bluetooth traffic pattern and Wi-Fi link distance, exemplary solutions can include adjustment of Wi-Fi transfer rate and/or the preamble. Furthermore, utilizing the flexibility of Wi-Fi data transmission, the Wi-Fi payload can be adjusted. These exemplary methods can substantially avoid collision between Bluetooth and Wi-Fi packets by causing one transmission method to be active while the other method is inactive.

In one exemplary embodiment of exclusive collaboration, transmission of Wi-Fi frames can be precluded, while transmission of Bluetooth continued. In another embodiment, transmission of Bluetooth may be precluded while transmission of Wi-Fi continues. However, during exclusive collaboration, priority must be assigned to the transmission and receipt of data, since generally only one of either Bluetooth and Wi-Fi is transmitted or received at any given time. This priority is discussed below in greater detail in relation to FIG. 4.

Figure 3:
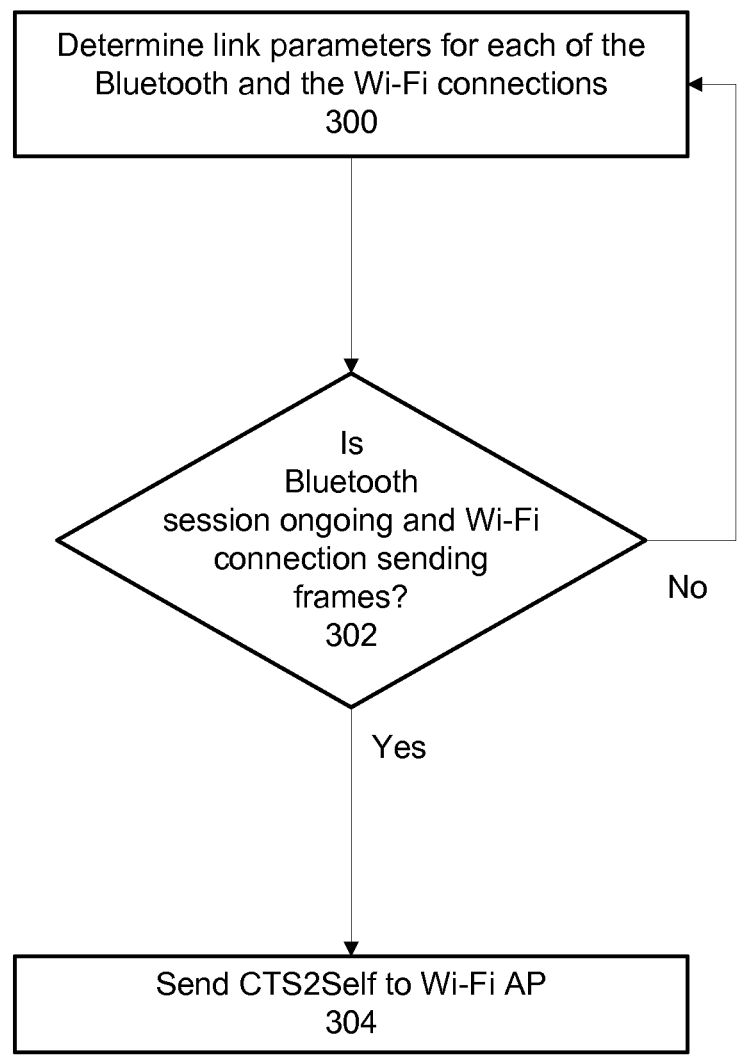
FIG. 3 illustrates an exemplary embodiment of a process for providing exclusive collaborative coexistence between Bluetooth and Wi-Fi on an electronic device.

FIG. 3 illustrates an exemplary embodiment of a process for providing exclusive collaborative coexistence between Bluetooth and Wi-Fi on an electronic device. The process in FIG. 3 may be performed alone or as a continuation of the process described in FIG. 2. Link parameters are optionally determined for each of a Bluetooth connection 110 and a Wi-Fi connection 108 respectively (step 300). If the process is a continuation of that shown in FIG. 2, e.g., step 210, then step 300 may be omitted.

When a user seeks to use the Bluetooth functionality of the electronic device 100 while a Wi-Fi connection 108 exists, the Wi-Fi connection 108 to the Wi-Fi access point 114 can be lost. This can detract from the user experience, because after the user has finished using his or her Bluetooth connection 110, they must recreate a Wi-Fi connection.

Therefore, according to the exemplary embodiment, when a Bluetooth session is on-going and the electronic device 100 detects that the Wi-Fi access point 114 is sending frames (step 302), the electronic device 100 can cause a signal, such as clear-to-send-to-self ("CTS2self") signal, to be sent to the Wi-Fi access point 114 (step 304), thereby precluding the Wi-Fi access point 114 from transmitting frames in the area proximate to the electronic device 100.

Transmission of the CTS2self signal provides the electronic device 100 with an exclusive collaborative solution to the problem of Bluetooth-Wi-Fi interference that protects the Bluetooth session from interference from the Wi-Fi access point 114 while maintaining the Wi-Fi connection 108 between the electronic device 100 and the Wi-Fi access point 114. Using CTS2self can also be advantageous because it can prevent the Wi-Fi access point 114 from sending frames to the electronic device 100 when Bluetooth signals are being transmitting, which can prevent the Wi-Fi data rate from decreasing and being maintained at a relatively low rate. CTS2self can be any signal sent from the electronic device 100 to the Wi-Fi access point 114 that causes the Wi-Fi access point 114 to stop transmitting frames to the physical area proximate to the electronic device 100.

Alternatively, instead of sending CTS2self to the Wi-Fi access point 114, the electronic device 100 can transmit a null-data frame with a power management value set to 1. This informs the Wi-Fi access point 114 that the electronic device 100 is in a state where the Wi-Fi access point 114 no longer needs to transmit frames to the electronic device 100 (e.g., that the electronic device 100 is in a power-saving or sleep mode). This solution can be less intrusive than transmitting a CTS2self signal, but may result in the Wi-Fi access point 114 sending residual frames in a MAC queue after the null data frame is received, which may cause the Wi-Fi data rate to decrease.

In many electronic devices, the device front end does not support allowing the receipt of Wi-Fi access point ("AP") frames while a Bluetooth session is on-going. Although the processes described hereinabove are primarily useful in such devices, the process may also be used in electronic devices that include a front end that supports receiving Wi-Fi AP frames while a Bluetooth session is on-going when an exclusive collaborative solution is desired.

Figure 4:
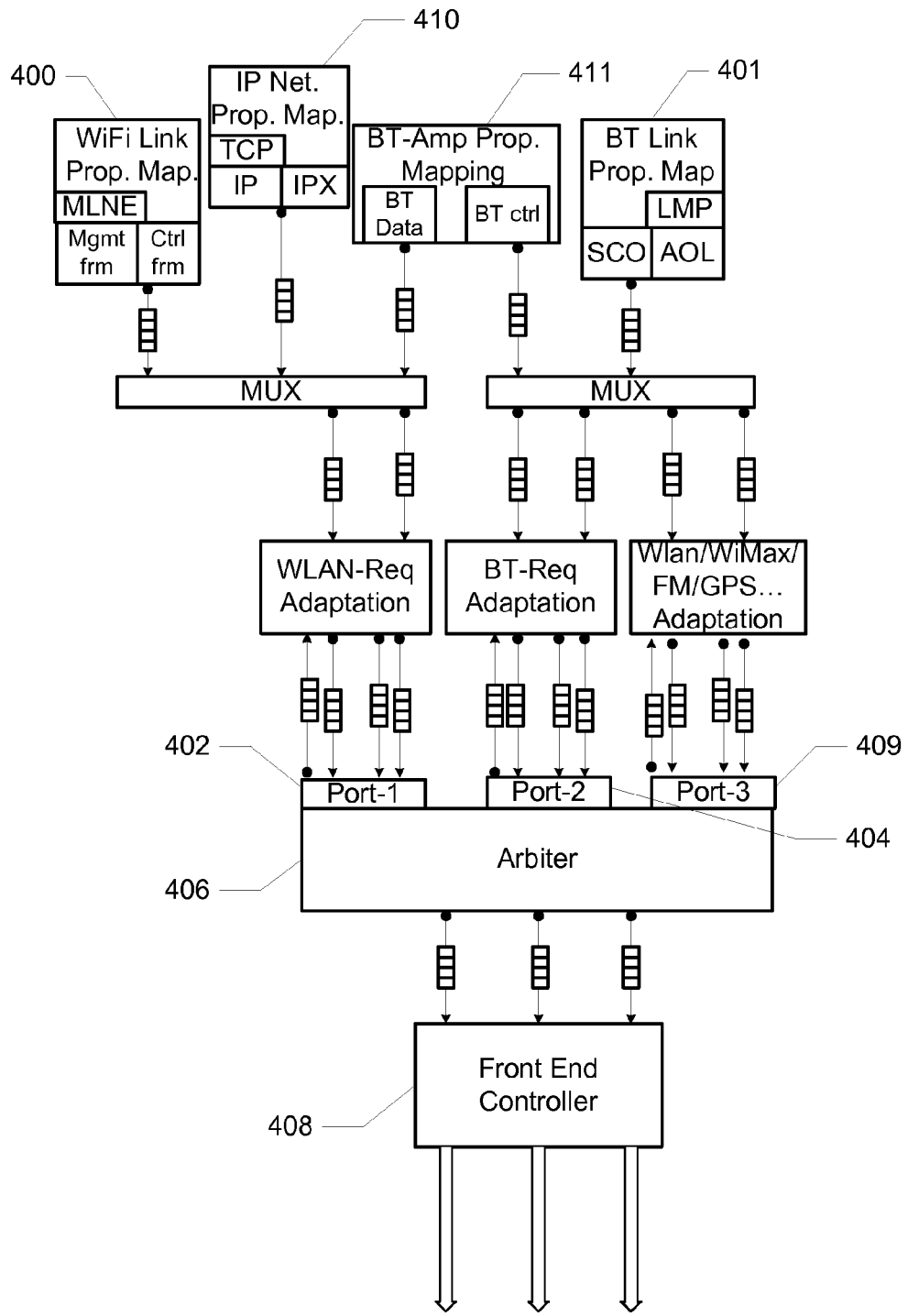
FIG. 4 illustrates an exemplary embodiment of a system for performing exclusive arbitration for Bluetooth and Wi-Fi collaborative coexistence on a single device.

FIG. 4 illustrates an exemplary embodiment of a system managing such priority for Bluetooth and Wi-Fi exclusive collaboration. The system can include Wi-Fi link priority mapper 400, Bluetooth link priority mapper 401, IP network priority mapper 410, BT-AMP priority mapper 411, Wi-Fi port 402, Bluetooth port 404, WiMax port 409, arbiter 406, and front end controller 408.

The arbiter 406 receives data from the Wi-Fi data stream and the Bluetooth data stream, and determines which data has priority for transmission and/or receipt. The data received by the arbiter 406 has a priority assigned by, for example, by the Wi-Fi link priority mapper 400 or the Bluetooth link priority mapper 401. The IP network priority mapper 410 and the BT-AMP priority mapper 411 can also supply priorities to data sent to the arbiter 406. Priority may be assigned for individual data packets, transactions (e.g., a Wi-Fi ACK frame), transfers (e.g., a Wi-Fi transmission burst), or any combination thereof. After the data is multiplexed, the arbiter 406 can receive the Wi-Fi data stream through the Wi-Fi port 402, and can also receive the Bluetooth data stream through the Bluetooth port 404. In some embodiments, arbiter 406 may receive data from another port, such as the WiMax port 409, which can provide data to be transmitted wirelessly. After arbiter 406 prioritizes data received from the various data streams, the prioritized data can be provided to front end controller 408, which can cause the front end of the electronic device to transmit and/or receive the data based upon the data's priority.

A method and system for a multi-layer approach for Wi-Fi and Bluetooth collaborative coexistence on an electronic wireless device has been disclosed. The present invention is mainly described in terms of particular systems provided in particular implementations. However, this method and system may operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

The present invention has been described in accordance with the embodiments shown, and there could be variations to the embodiments, and any variations would be within the scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made without departing from the scope of the appended claims.

We claim:

1. A method for providing a Bluetooth connection and a Wi-Fi connection on an electronic device, wherein the Wi-Fi connection exists between the electronic device and a Wi-Fi access point, the method comprising:

determining i) first Bluetooth link parameters representing radio frequency signal characteristics of the Bluetooth connection from the perspective of the electronic device, and ii) first Wi-Fi link parameters representing radio frequency signal characteristics of the Wi-Fi connection from the perspective of the electronic device;

determining i) second Bluetooth link parameters representing radio frequency signal characteristics of the Bluetooth connection from the perspective of the Bluetooth peer device, and ii) second Wi-Fi link parameters representing radio frequency signal characteristics of the Wi-Fi connection from the perspective of the Wi-Fi access point;

calculating one or more link conditions, based upon i) one or more of the first Bluetooth link parameters, ii) one or more of the second Bluetooth link parameters, iii) one or more of the first Wi-Fi link parameters, and iv) one or more of the second Wi-Fi link parameters, to determine if simultaneous transmission from the Bluetooth connection and the Wi-Fi connection is feasible;

in response to determining simultaneous-transmission to be feasible, altering at least one of i) a Bluetooth transmit power of the electronic device, ii) a transmit power of the Bluetooth peer device, iii) frequency characteristics of the Bluetooth connection, iv) a Wi-Fi transmit power of the electronic device,
v) a transmit power of the Wi-Fi access point, and
vi) a channel of the Wi-Fi connection,
based on the one or more link conditions to permit simultaneous transmission from the Bluetooth connection and the Wi-Fi connection; and in response to determining simultaneous transmission to be unfeasible, implementing exclusive transmission to allow coexistence between the Bluetooth connection and the Wi-Fi connection including precluding the Wi-Fi access point from transmitting frames in an area proximate to the electronic device.

2. The method of claim 1, further comprising determining that simultaneous transmission is feasible when Bluetooth-Wi-Fi interference does not exceed a predetermined threshold level of performance for at least one of the Bluetooth connection and the Wi-Fi connection.

3. The method of claim 2, wherein the Bluetooth-Wi-Fi interference is based on at least the first Bluetooth link parameters, the second Bluetooth link parameters, the first Wi-Fi link parameters, and the second Wi-Fi link parameters.

4. The method of claim 3, wherein the Bluetooth-Wi-Fi interference is based on i) receiver saturation of Bluetooth and Wi-Fi receivers, and ii) signal-to-noise ratios of the Bluetooth and Wi-Fi transmissions transmitted and received by the electronic device.

5. The method of claim 1, wherein the exclusive transmission comprises transmitting a clear-to-send-to-self transmission from the electronic device to the Wi-Fi access point to preclude the Wi-Fi access point from transmitting frames in an area proximate to the electronic device.

6. The method of claim 1, wherein the Bluetooth connection further comprises a Bluetooth data stream, wherein the Wi-Fi connection further comprises a Wi-Fi data stream, and wherein the exclusive transmission comprises i) assigning priority to data from the Bluetooth data stream and the Wi-Fi data stream, and ii) transmitting the data based upon the priority.

7. The method of claim 1, wherein the electronic device further comprises a front end, wherein the front end is configured to:
electronically couple to i) a Bluetooth antenna, and ii) a Wi-Fi antenna, and
permit substantially simultaneous transmitting and receiving from the Bluetooth connection and the Wi-Fi connection.

8. A non-transitory computer-readable medium containing program instructions for providing a Bluetooth connection and a Wi-Fi connection on an electronic device, wherein the Wi-Fi connection exists between the electronic device and a Wi-Fi access point, the program instructions for:
determining i) first Bluetooth link parameters representing radio frequency signal characteristics of the Bluetooth connection from the perspective of the electronic device, and ii) first Wi-Fi link parameters representing radio frequency signal characteristics of the Wi-Fi connection from the perspective of the electronic device;
determining i) second Bluetooth link parameters representing radio frequency signal characteristics of the Bluetooth connection from the perspective of the Bluetooth peer device, and ii) second Wi-Fi link parameters representing radio frequency signal characteristics of the Wi-Fi connection from the perspective of the Wi-Fi access point;
calculating one or more link conditions, based upon i) one or more of the first Bluetooth link parameters, ii) one or more of the second Bluetooth link parameters, iii) one or more of the first Wi-Fi link parameters, and iv) one or more of the second Wi-Fi link parameters, to determine if simultaneous transmission from the Bluetooth connection and the Wi-Fi connection is feasible;

in response to determining simultaneous-transmission to be feasible, altering at least one of
i) a Bluetooth transmit power of the electronic device,
ii) a transmit power of the Bluetooth peer device,
iii) frequency characteristics of the Bluetooth connection,
iv) a Wi-Fi transmit power of the electronic device,
v) a transmit power of the Wi-Fi access point, and
vi) a channel of the Wi-Fi connection,
based on the one or more link conditions, to permit simultaneous transmission from the Bluetooth connection and the Wi-Fi connection; and in response to determining simultaneous transmission to be unfeasible, implementing exclusive transmission to allow coexistence between the Bluetooth connection and the Wi-Fi connection including precluding the Wi-Fi access point from transmitting frames in an area proximate to the electronic device.

9. The non-transitory computer readable medium of claim 8, further comprising program instructions for determining that simultaneous transmission is feasible when Bluetooth-Wi-Fi interference does not exceed a predetermined threshold level of performance for at least one of the Bluetooth connection and the Wi-Fi connection.

10. The non-transitory computer readable medium of claim 9, wherein the Bluetooth-Wi-Fi interference is based on at least the first Bluetooth link parameters, the second Bluetooth link parameters, the first Wi-Fi link parameters, and the second Wi-Fi link parameters.

11. The non-transitory computer readable medium of claim 10, wherein the Bluetooth-Wi-Fi interference is based on i) receiver saturation of Bluetooth and Wi-Fi receivers, and ii) signal-to-noise ratios of the Bluetooth and Wi-Fi transmissions transmitted and received by the electronic device.

12. The non-transitory computer readable medium of claim 8, wherein the program instructions for implementing exclusive transmission comprises program instructions for transmitting a clear-to-send-to-self transmission from the electronic device to the Wi-Fi access point to preclude the Wi-Fi access point from transmitting frames in an area proximate to the electronic device.

13. The non-transitory computer readable medium of claim 8, wherein the Bluetooth connection further comprises a Bluetooth data stream, wherein the Wi-Fi connection further comprises a Wi-Fi data stream, and wherein the program instructions for implementing exclusive transmission comprises:
program instructions for assigning priority to data from the Bluetooth data stream and the Wi-Fi data stream; and
program instructions for transmitting the data based upon the priority.

14. A system for providing a Bluetooth connection and a Wi-Fi connection on an electronic device, wherein the Wi-Fi connection exists between the electronic device and a Wi-Fi access point, the system comprising:
a Wi-Fi antenna configured to transmit and receive the Wi-Fi connection, wherein
first Wi-Fi link parameters represent radio frequency signal characteristics of the Wi-Fi connection from the perspective of the electronic device, and
second Wi-Fi link parameters represent radio frequency signal characteristics of the Wi-Fi connection from the perspective of the Wi-Fi access point;

a Bluetooth antenna configured to transmit and receive the Bluetooth connection, wherein first Bluetooth link parameters represent radio frequency signal characteristics of the Bluetooth connection from the perspective of the electronic device, and second Bluetooth parameters represent radio frequency signal characteristics of the Bluetooth connection from the perspective a Bluetooth peer device;

a front end coupled to the Wi-Fi antenna and the Bluetooth antenna, wherein the front end is configured to permit substantially simultaneous transmitting and receiving from the Bluetooth connection and the Wi-Fi connection; and a processor executing machine readable instructions that, when executed by the processor, cause the processor to:

calculate one or more link conditions, based upon i) one or more of the first Bluetooth link parameters, ii) one or more of the second Bluetooth link parameters, iii) one or more of the first Wi-Fi link parameters, and iv) one or more of the second Wi-Fi link parameters, to determine if simultaneous transmission from the Bluetooth connection and the Wi-Fi connection is feasible;

in response to determining simultaneous transmission to be feasible, alter at least one of i) a Bluetooth transmit power of the electronic device,
ii) a transmit power of the Bluetooth peer device,
iii) frequency characteristics of the Bluetooth connection,
iv) a Wi-Fi transmit power of the electronic device,
v) a transmit power of the Wi-Fi access point, and
vi) a channel of the Wi-Fi connection, based on the one or more link conditions to permit simultaneous transmission from the Bluetooth connection and the Wi-Fi connection; and in response to determining simultaneous transmission to be unfeasible, implementing exclusive transmission to allow coexistence between the Bluetooth connection and the Wi-Fi connection including precluding the Wi-Fi access point from transmitting frames in an area proximate to the electronic device.

15. The system of claim 14, wherein it is determined that simultaneous transmission is feasible when Bluetooth-Wi-Fi interference does not exceed a predetermined threshold level of performance for at least one of the Bluetooth connection and the Wi-Fi connection.

16. The system of claim 15, wherein the Bluetooth-Wi-Fi interference is based on at least the first Bluetooth link parameters, the second Bluetooth link parameters, the first Wi-Fi link parameters, and the second Wi-Fi link parameters.

17. The system of claim 16, wherein the Bluetooth-Wi-Fi interference is based on i) receiver saturation of Bluetooth and Wi-Fi receivers, and ii) signal-to-noise ratios of the Bluetooth and Wi-Fi transmissions transmitted and received by the electronic device.

18. The system of claim 14, wherein the exclusive transmission comprises transmitting a clear-to-send-to-self transmission from the electronic device to the Wi-Fi access point to preclude the Wi-Fi access point from transmitting frames in an area proximate to the electronic device.

19. The system of claim 14, wherein the Bluetooth connection further comprises a Bluetooth data stream, wherein the Wi-Fi connection further comprises a Wi-Fi data stream, further comprising an arbiter, wherein the arbiter is configured to assign priority to data from the Wi-Fi data stream and the Bluetooth data stream.

20. A method for providing collaborative coexistence between a Bluetooth connection and a Wi-Fi connection on an electronic device, wherein the Wi-Fi connection exists between the electronic device and a Wi-Fi access point, comprising:

determining i) first Bluetooth link parameters representing radio frequency signal characteristics of the Bluetooth connection from the perspective of the electronic device, and ii) first Wi-Fi link parameters representing radio frequency signal characteristics of the Wi-Fi connection from the perspective of the electronic device;

determining i) second Bluetooth link parameters representing radio frequency signal characteristics of the Bluetooth connection from the perspective of the Bluetooth peer device, and ii) second Wi-Fi link parameters representing radio frequency signal characteristics of the Wi-Fi connection from the perspective of the Wi-Fi access point;

calculating one or more link conditions, based upon i) one or more of the first Bluetooth link parameters, ii) one or more of the second Bluetooth link parameters, iii) one or more of the first Wi-Fi link parameters, and iv) one or more of the second Wi-Fi link parameters, to determine if simultaneous transmission from the Bluetooth connection and the Wi-Fi connection is feasible;

in response to determining simultaneous-transmission to be feasible, altering at least one of i) a Bluetooth transmit power of the electronic device,
ii) a transmit power of the Bluetooth peer device, and
iii) a Wi-Fi transmit power of the electronic device, based on the one or more link conditions to permit simultaneous transmission from the Bluetooth connection and the Wi-Fi connection; and in response to determining simultaneous transmission to be unfeasible, implementing exclusive transmission to allow coexistence between the Bluetooth connection and the Wi-Fi connection including precluding the Wi-Fi access point from transmitting frames in an area proximate to the electronic device.

* * * * *